United States Patent
Yamazaki et al.

[11] Patent Number: 6,127,753
[45] Date of Patent: Oct. 3, 2000

[54] MEMBER TO FORM MOTOR STATOR

[75] Inventors: Akihiko Yamazaki; Manabu Okamoto, both of Takefu; Yasutake Seki, Sabae; Kakue Takasaki, Takefe, all of Japan

[73] Assignee: Matsushita Electric Industrial Co., Ltd., Japan

[21] Appl. No.: 09/380,657

[22] PCT Filed: Mar. 25, 1998

[86] PCT No.: PCT/JP98/01357

§ 371 Date: Sep. 7, 1999

§ 102(e) Date: Sep. 7, 1999

[87] PCT Pub. No.: WO98/44616

PCT Pub. Date: Oct. 8, 1998

[30] Foreign Application Priority Data

Mar. 28, 1997 [JP] Japan ................................. 9-077014

[51] Int. Cl.[7] ............................. H02K 3/52; H02K 3/38; H02K 3/46; H02K 1/06
[52] U.S. Cl. ............................. 310/71; 310/194; 310/216
[58] Field of Search ............................. 310/71, 194, 254, 310/264, 269, 216; 29/596, 597, 598, 735; 424/433.3, 433.4, 432.6

[56] References Cited

U.S. PATENT DOCUMENTS

| | | | |
|---|---|---|---|
| 2,894,157 | 7/1959 | Morrill | 310/179 |
| 4,350,914 | 9/1982 | Searle | 310/194 |
| 4,365,180 | 12/1982 | Licata et al. | 310/216 |
| 5,389,846 | 2/1995 | Okazaki et al. | 310/40 MM |
| 5,477,096 | 12/1995 | Sakashita et al. | 310/216 |
| 5,592,731 | 1/1997 | Huang et al. | 29/596 |

FOREIGN PATENT DOCUMENTS

| | | |
|---|---|---|
| 0652622 | 5/1995 | European Pat. Off. . |
| 59-191445 | 10/1984 | Japan . |
| 1-69238 | 3/1989 | Japan . |
| 8-19196 | 1/1996 | Japan . |
| 8-223843 | 8/1996 | Japan . |
| 9-191588 | 7/1997 | Japan . |

Primary Examiner—Clayton LaBalle
Assistant Examiner—Tran N Nguyen
Attorney, Agent, or Firm—Parkhurst & Wendel, L.L.P.

[57] ABSTRACT

In a method to manufacture a stator by coupling a plurality of core segments as so to compose a serial body of core segments and rounding the serial body into an annular body, a stator which method can secure an optimum length of a connected wire by preventing the connecting wire from being too long or too short between the core segments at a stage to round the serial body of core segments into the annular body and method of manufacturing thereof are provided. A member to form a motor stator is composed of a plurality of core segments which are movably coupled, a plurality of insulators which cover the core segments and have head portions having spaces allowing a connecting wire to pass therethrough, and the coil wire which is wound around the core segments to form a coil and serves as a connecting wire passing through the head portions, the member being capable of securing an optimum length of the connecting wire.

4 Claims, 7 Drawing Sheets

MEMBER TO FORM MOTOR STATOR

This application is a 371 of PCT/JP98/01357.

TECHNICAL FIELD

The present invention relates to a stator of motors which is manufactured by winding a coil around a plurality of core segments which are coupled in series to compose coil phases and rounding the core segments into an annular body as well as a manufacturing method of the stator.

BACKGROUND ART

Under the recent trend to economize energies, attempts are being made to develop motors with a most important theme to improve efficiencies. A most difficult problem in these attempts to develop motors which have improved efficiencies lies in realization of windings which are formed at high spatial occupation ratios in stator slots.

A stator of a motor is manufactured by winding a wire around a cylindrical stator core which is subjected to an insulating treatment. However, the cylindrical form of the stator core makes a winding work tedious, and in winding works using nozzles for example, forms of windings and slots are restricted by shapes of the nozzles and driving loci of the nozzles, resulting in limited spatial occupation ratios of windings. To solve this problem, there has been disclosed a method to create a space which facilitates control of winding around a winding slot by winding a wire after coupling a plurality of core segments which are to compose a stator so as to form a serial body. (Japanese Patent Application Laid-Open No. 8-19196).

The serial body of core segments is composed, for example, of core segments 11 which are punched out as integral cores, laminated and coupled by way of easily deformable thin links 14 as shown in FIG. 4 or core segments 11 which consist of core sheets 10 punched out independently and laminated, have concave grooves 15 and convex pieces 16, and are assembled into a serial body by coupling the concave grooves 15 with the convex pieces 16 so as to be rotatable around coupled portions as shown in FIG. 5.

At a stage to form an annular body after winding a wire around a serial body 13 of core segments, a length of a connecting wire which connects coils of the core segments constitutes a factor important for forming the annular body. When the connecting wire is too long, it is overabundant and constitutes a cause for troubles such as seizure of the connecting wire at a stage to complete a motor. If it is too short, in contrast, it constitutes a cause for troubles such as wire breakage at a stage to form the annular body.

Further, it is practiced, as an ordinary method for winding a wire around the serial body 13 of core segments, to wind a coil for each phase around the core segments 11 sequentially one by one. FIG. 7(a) shows a conventional example to wind a wire around a serial body of core segments specified for three phases. After keeping a winding start terminal wire 22 on a terminal or the like arranged on No. 1 core segment, a coil for phase A is wound around Nos. 1, 4, 7 and 10 core segments, and a winding end terminal wire 22 is kept on a terminal or the like arranged on the No. 10 core segment to complete the winding of the coil for the phase A. Wires for phases B and C are wound in the similar procedures. Since the wires for the three phases are wound in series sequentially as described above, this winding method requires terminal treatments six times in total or a large number of winding steps.

The present invention provides a method to manufacture a stator by coupling a plurality of core segments so as to form a serial body of core segments and rounding the serial body into an annular body, which does not allow a connecting wire to be too long or too short between the core segments at a stage to round the serial body of core segments into the annular body as well as a stator which secures an optimum length of a connecting wire and a winding method which minimizes a number of steps to wind a wire around a serial body of core segments.

DISCLOSURE OF THE INVENTION

The member to form a motor stator according to the present invention consists of a plurality of core segments which are movably coupled, a plurality of insulators which cover the core segments and have head portions having spaces allowing a connecting wire to pass therethrough, and a coil wire which is to be wound around the core segments to form coils and serves as a connecting wire passing through the head portions, thereby being capable of obtaining a connecting wire having an optimum length and allowing the wire to be wound at a minimum number of steps.

Further, the member to form a motor stator according to the present invention is configured to arrange the connecting wire on a pitch line of bent link portions of the core segment, thereby being capable of adequately tensing the connecting wire with no tension or flexure even after the serial body is rounded into an annular body.

Furthermore, a back plate is erected at the back of a bottom plate of the head portion of the insulator, an outer guide is erected in front of the bottom plate, and a connecting wire guide is erected on the bottom plate so as to locate a tip thereof in the vicinity of the bent link portion of the core segment, the connecting wire is passed through a narrow space formed by the back plate and the outer guide so as to be in contact with the tip of the connecting wire guide. Accordingly, the member to form a motor stator is capable of maintaining the connecting wire leading to the bent link portion stably on the insulator, securing stability of the connecting wire at subsequent manufacturing steps and maintaining a stable condition of the connecting wire at the subsequent manufacturing steps.

Moreover, a motor stator can be easily manufactured by rounding the component member to form a motor stator into an annular body.

Moreover, the manufacturing method of motor stator according to the present invention repeats a step to wind a coil wire around core segments for a first phase continuously from a core segment at one end, a step to wind the coil wire around a terminal at the other end, a step to wind the coil wire around core segments for a second phase continuously from the other end, a step to connect the coil wire to a terminal at the one end and a step to wind the coil wire around core segments for a third phase again from the one end to the other end on a coupled body composed of a plurality of core segments which are movably coupled, and a plurality of insulators which cover the core segments and have head portions having spaces allowing the connecting wire to pass therethrough. Since the coil ends for a plurality of phases are connected to a terminal by utilizing a fact that one of the ends of the coil for each phase is a neutral point of a motor coil and the winding steps shifted from a core segment to another core segment in a serial body of the core segments form a linear movement, the reciprocal shifting motion is utilized for winding as it is, thereby saving useless movements and allowing wires to be wound around the serial body of core segments in a minimum number of steps.

BEST MODE FOR CARRYING OUT THE INVENTION

Now, preferred embodiments of the present invention will be described with reference to the accompanying drawings.

First Embodiment

Figure 1:
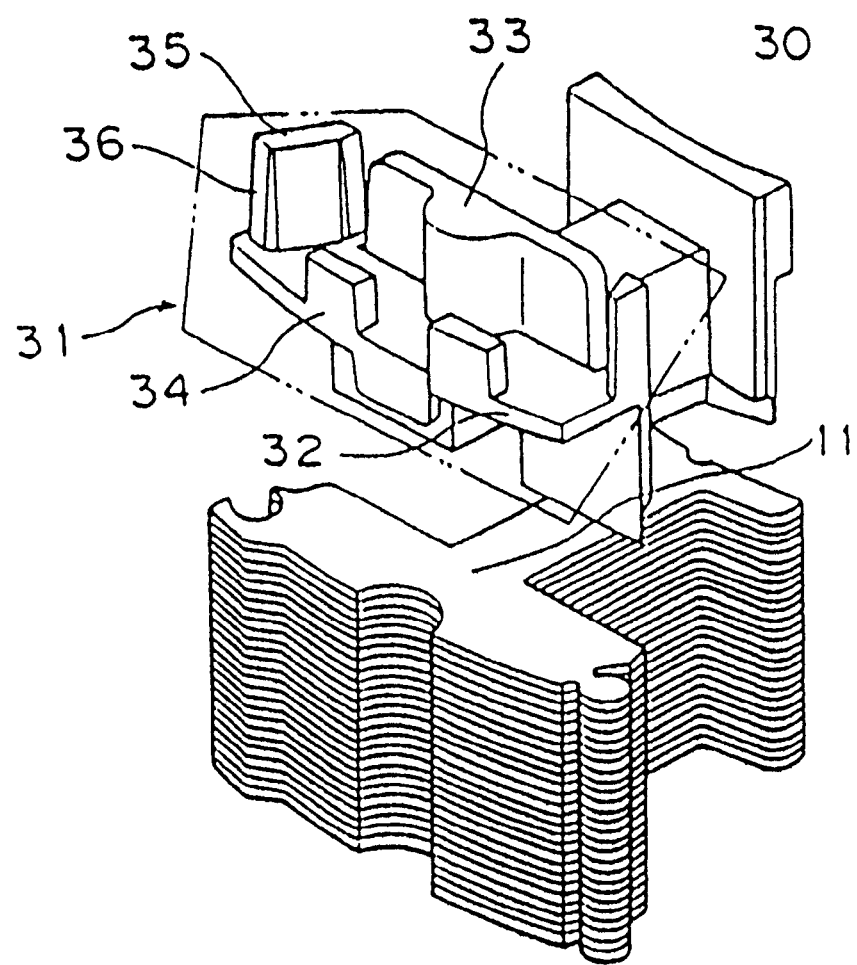
FIG. 1 is a perspective view illustrating, in a disassembled condition, a core segment preferred as a first embodiment of the present invention.

FIG. 1 shows an insulator 30 which is to be attached to a core segment 11, or is fitted over the core segment 11 like a cap. The insulator 30 covers the core segment 11 so that it is not brought into direct contact with a coil by disposing a head 31 on a york portion of the core segment 11 so that a back plate 33 is disposed perpendicularly at the back of a bottom plate 32, an outer guide 34 is disposed perpendicularly in front of the bottom plate 32 and a connecting wire guide 35 is formed at one end of the bottom plate 32.

Figure 2:
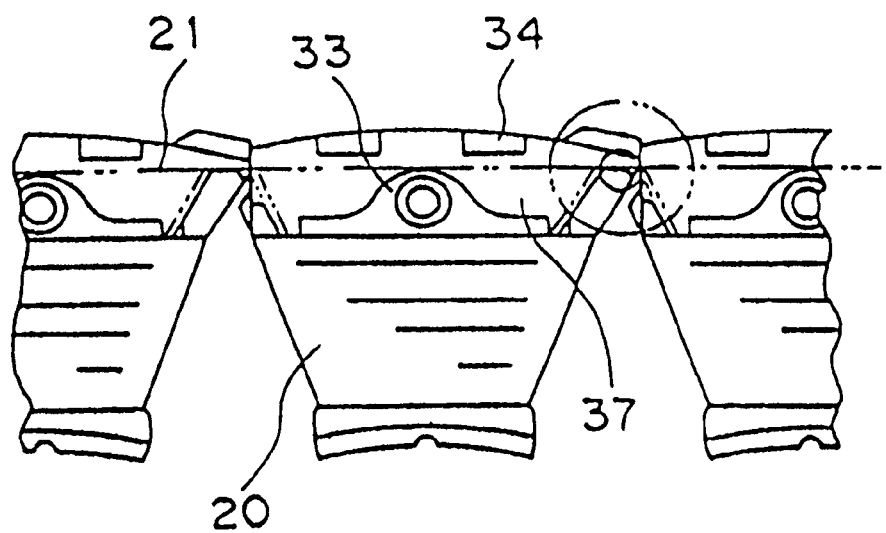
FIG. 2 is a diagram illustrating main members of a serial body of the core segment on an enlarged scale.
Figure 3:
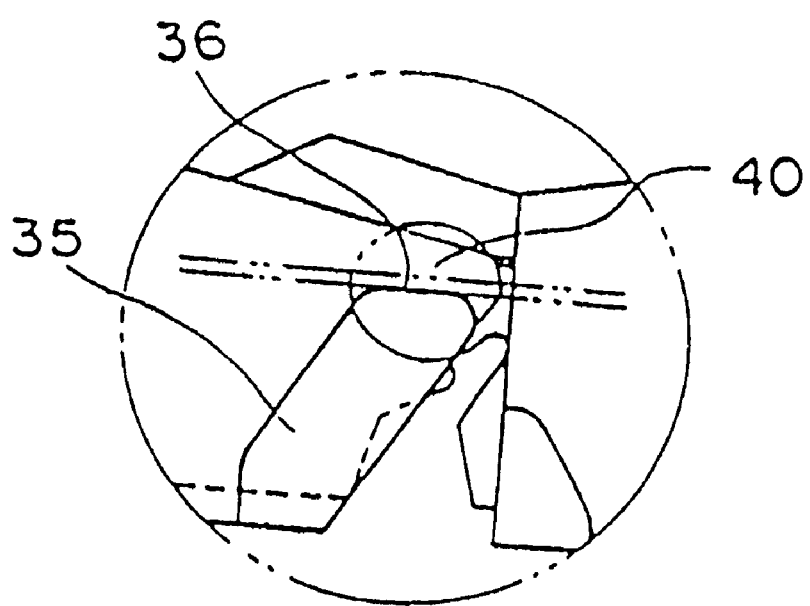
FIG. 3 is a diagram partially illustrating a serial body of the core segment.
Figure 4:
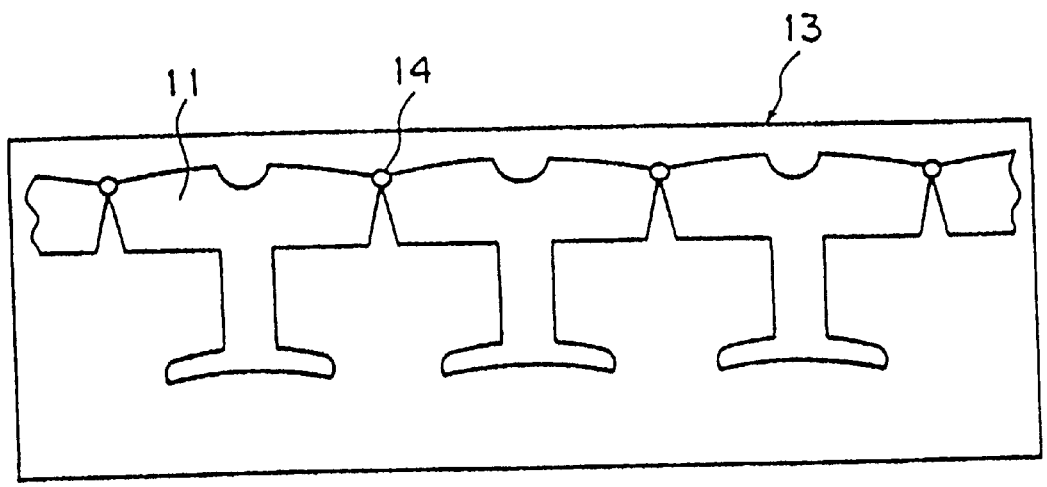
FIG. 4 is a diagram partially illustrating a conventional serial body of core segments.
Figure 5A:
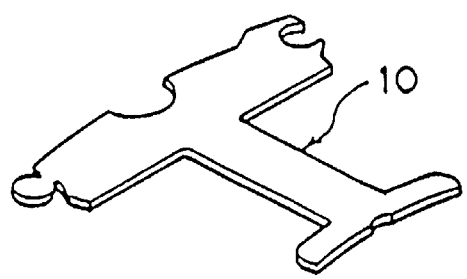
FIG. 5(a) is a perspective view illustrating a conventional core sheet.
Figure 5B:
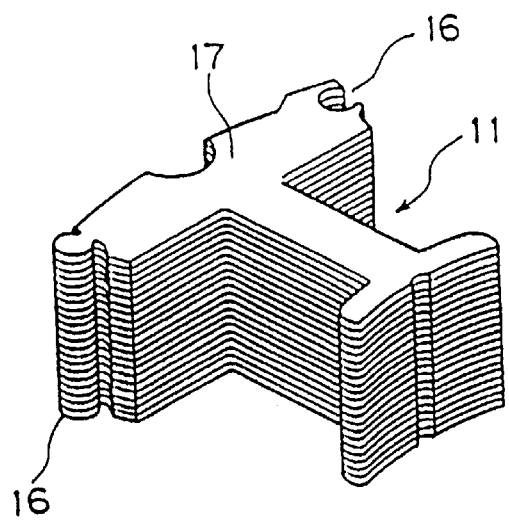
FIG. 5(b) is a perspective view illustrating the core segment.
Figure 5C:
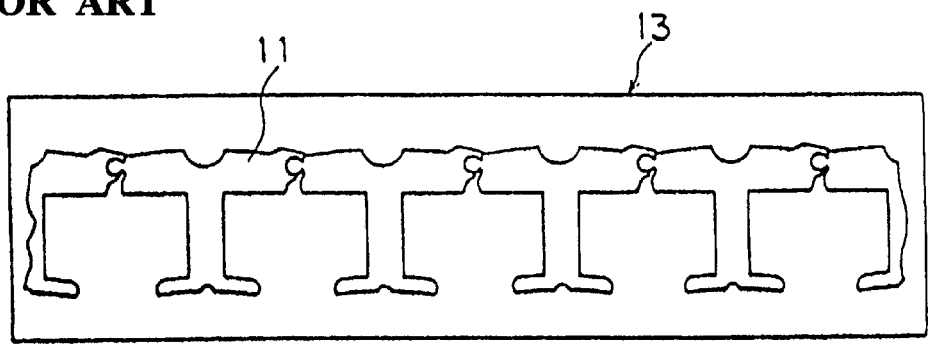
FIG. 5(c) is a diagram illustrating a serial body of the core segments.

FIGS. 2 and 3 show windings made on a serial body of the core segment 11 over which the insulator 30 is fitted: a connecting wire 21 being disposed on the head 31 of the insulator 30. The connecting wire 21 passes through a space 37 formed between the back plate 33 and the outer guide 34, and is positioned on a bent link portion 40 of the core segment by a tip 36 of the connecting wire guide. The tip 36 of the connecting wire guide is disposed in the vicinity of a center of the bent link portion 40 of the core segment so that the connecting wire 21 passes through the center of the bent link portion 40 of the core segment. Accordingly, the connecting wire 21 can be disposed at an adequate length around an annular body with no tension or flexure even when the core segments 11 are bent around the bent link portions 40 of the core segments so as to form the annular body.

Second Embodiment

Figure 6:
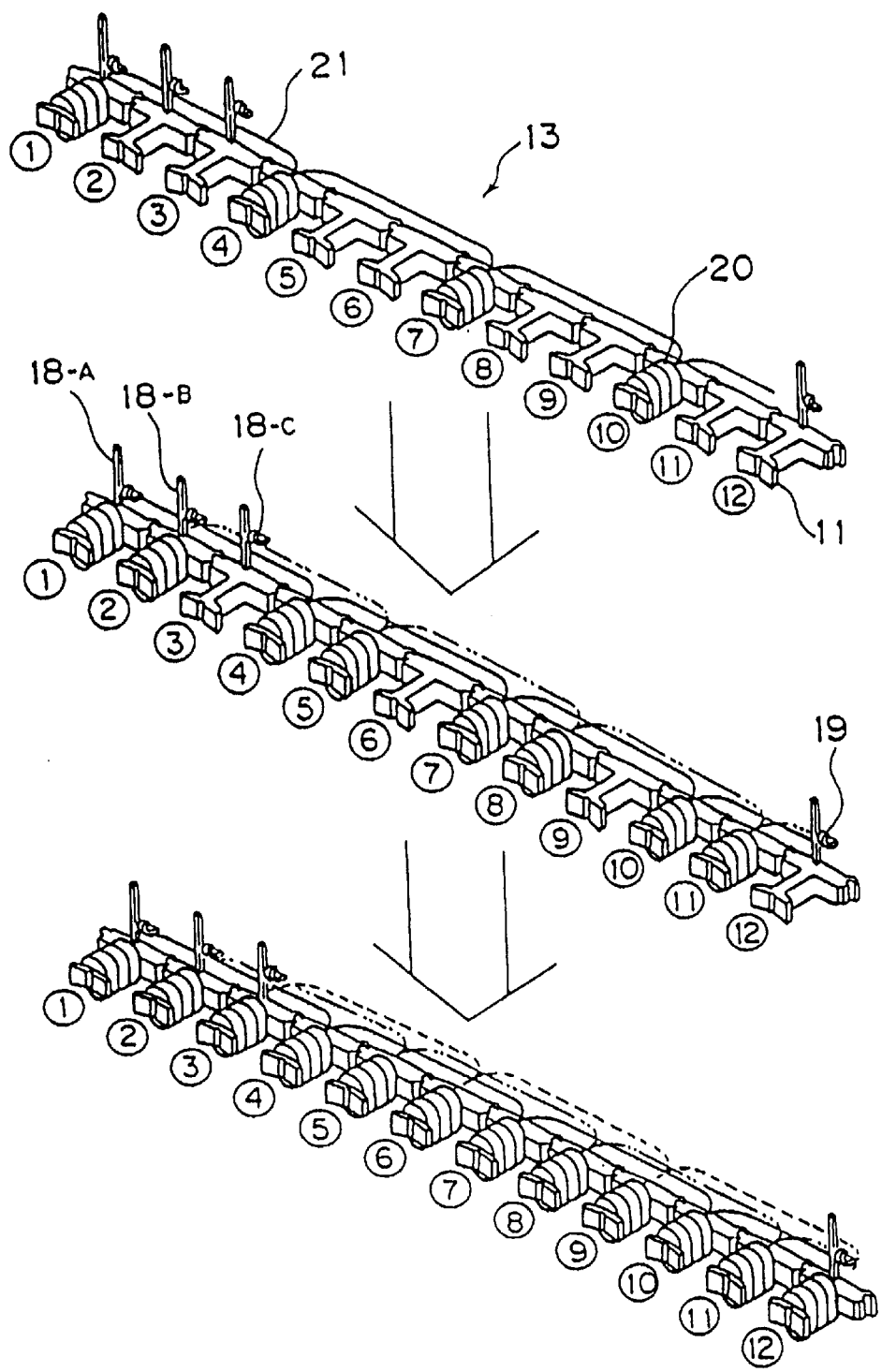
FIG. 6 is a diagram illustrating a winding step for a serial body of core segments preferred as a second embodiment of the present invention.
Figure 7A:
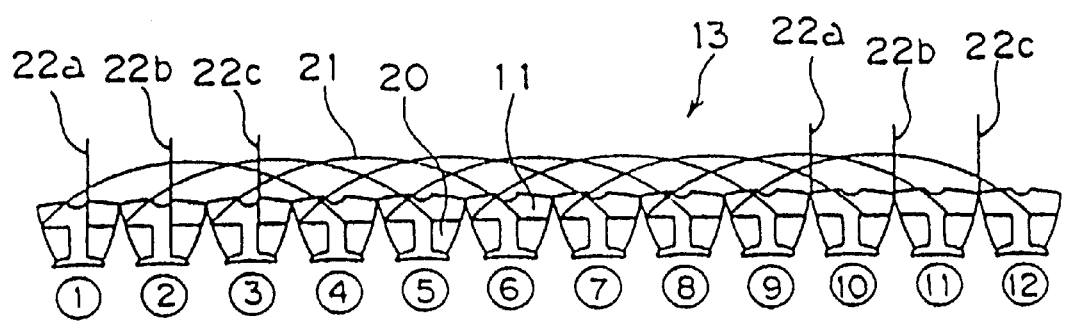
FIG. 7(a) is a diagram illustrating an embodiment of a conventional winding method for core segments and FIG. 7(b) is a diagram illustrating a conventional annular body.
Figure 7B:
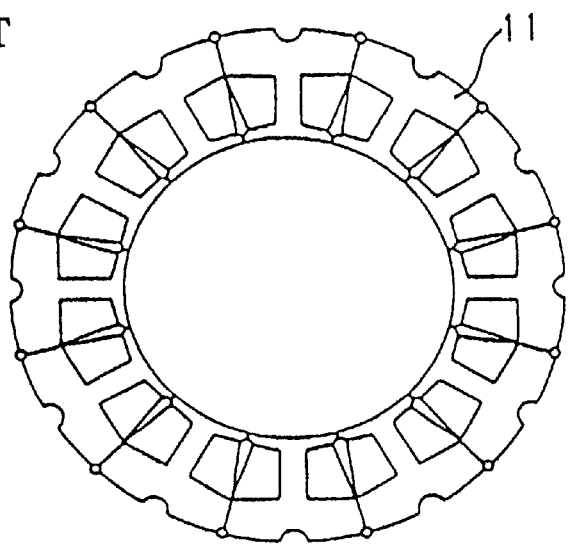

FIG. 6 shows steps to wind a coil 20 around a serial body 13 of core segments, or an embodiment of winding around a serial body which is composed of 12 core segments and specified for three phases. Though insulators are not fitted over the core segments 11 shown in the figure, coils are wound around the core segments 11 over which insulators 30 are actually fitted.

The core segments 11 are numbered as 1, 2, 3, . . . from one end. After a winding start wire is kept on a terminal 18-A for a phase A, the coil 20 is wound as a winding for phase A sequentially around No. 1 core segment 11-1, No. 4 core segment 11-4, No. 7 core segment 11-7 and No. 10 core segment 11-10 by way of a connecting wire 21. After the coil 20 is wound around the core segment 11-10, a coil terminal wire is kept on a terminal 19 for a neutral point and the coil 20 is successively wound as a winding for a phase B in a reverse order sequentially round No. 11 core segment 11-11, No. 8 core segment 11-8, No. 5 core segment 11-5 and No. 2 core segment 11-2 by way of the connecting wire 21. After the coil 20 is wound around the core segment 11-2, the coil terminal wire is kept on a terminal 18-B for the phase B and cut off. Then, the winding start wire is kept on a terminal 18-C as a winding for a phase C, the coil 20 is wound sequentially around No. 3 core segment 11-3, No. 6 core segment 11-6, No. 9 core segment 11-9 and No. 12 core segment 11-12 by way of the connecting wire 21. After the coil 20 is wound around the core segment 11-12, the coil terminal wire is kept on the terminal 19 for the neutral point to complete the winding step.

What is claimed is:

1. A member to form a motor stator comprising:

a plurality of core segments (11) which are movably coupled;

a plurality of insulators (30) which cover said core segments (11) and have head portions (31) having spaces allowing a connecting wire (21) to pass therethrough; and a coil wire (20) which is wound around said core segments (11) to form coil portions and serves as a connecting wire (21) passing through said head portions (31);

said connecting wire (21) being disposed over and in a vicinity of a pitch line of bent link portions (40) of said core segments (11);

said coupled plurality of core segments (11) being rounded into an annular body.

2. A member to form a motor stator according to claim 1, wherein a back plate (33) is erected at the back of a bottom plate (32) of the head position of the insulator, an outer guide (34) is erected in front of the bottom plate, and a connecting wire guide (35) is erected on the bottom plate so as to locate a tip (36) thereof in the vicinity of the bent link portion (40) of the core segment, respectively, and the connecting wire (21) is passed through a narrow space (37) formed by said back plate (33) and said outer guide (34) and disposed to be in contact with the tip (36) of said connecting wire guide (35).

3. A manufacturing method of a stator using a series body comprising a plurality of core segments (11) which are movably coupled and a plurality of insulators (30) which cover said core segments (11) and have head portions (31) having spaces allowing a connecting wire (21) to pass therethrough, said method comprising the steps of:

forming coil portions by winding said connecting wire (21) on said core segment (11) such that the connecting wire is disposed over and in the vicinity of the pitch line of the bent link portions (40) of a core segments (11); and after the coil portions have been formed, rounding said series body into an annular body.

4. A manufacturing method of a stator according to claim 3, using a series body comprising a plurality of core segments (11) which are movably coupled and a plurality of insulators (30) which cover said core segments (11) and have head portions (31) having spaces allowing a connecting wire (21) to pass therethrough, wherein said method comprises the steps of: disposing said connecting wire (21) over and in the vicinity of the pitch line of the bent link portions (40) of the core segments (11); continuously winding a coil wire around core segments for a first phase (11-4, 11-7 and 11-10) starting from a core segment (11-1) at one end; winding the coil wire around a terminal (19) at the other end; continuously winding the coil wire around core segments for a second phase (11-11, 11-8, 11-5 and 11-2) starting from the other end; connecting the coil wire to a terminal (18-B) at the one end; repeating the step of winding the coil wire around core segments for a third phase (11-3, 11-6, 11-9 and 11-12) again starting from the one end to the other end; and after the coil portions have been formed, rounding said series body into an annular body.

* * * * *

UNITED STATES PATENT AND TRADEMARK OFFICE
CERTIFICATE OF CORRECTION

PATENT NO. : 6,127,753
DATED : October 3, 2000
INVENTOR(S) : Akihiko YAMAZAKI et al.

It is certified that error appears in the above-identified patent and that said Letters Patent is hereby corrected as shown below:

On page 1, column 1, [75], correct the spelling of "Takefe" in the 4th inventors city of residence to --Takefu--

Signed and Sealed this

Seventeenth Day of April, 2001

NICHOLAS P. GODICI

Attest:

Attesting Officer

Acting Director of the United States Patent and Trademark Office